UNITED STATES PATENT OFFICE.

KARL SCHIRMACHER AND ARTHUR VOSS, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

VAT DYESTUFFS AND PROCESS OF MAKING SAME.

1,123,390. Specification of Letters Patent. Patented Jan. 5, 1915.

No Drawing. Application filed February 25, 1914. Serial No. 820,876.

*To all whom it may concern:*

Be it known that we, KARL SCHIRMACHER, Ph. D., chemist, and ARTHUR VOSS, Ph. D., chemist, citizens of the Empire of Germany, residing at Höchst-on-the-Main, Germany, have invented certain new and useful Improvements in Vat Dyestuffs and Processes of Making Same, of which the following is a specification.

We have found that the coloring matters of the general constitution:

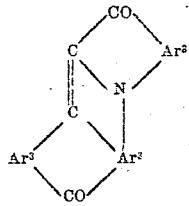

wherein $Ar^1$, $Ar^2$, $Ar^3$ stand for aryl residues which may be substituted in whatever manner, are valuable vat dyestuffs, dyeing cotton on reduction with alkaline hydrosulfite tints of great variety and of excellent fastness. These new dyestuffs are obtained by heating α-halogen-substituted anthraquinones with the salts of the aromatic glycins, converting the resulting anthraquinonyl-α-arylglycins of the general formula:

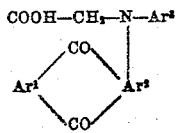

into the corresponding esters by heating them with an alcohol and a mineral acid or heating with dialkylsulfates by then eliminating water from the said esters by heating with alcoholic alkali with simultaneous saponification, and finally by treating the thus produced anthra-N-arylpyrroll-carboxylic acids, the simplest member of which corresponds to the formula:

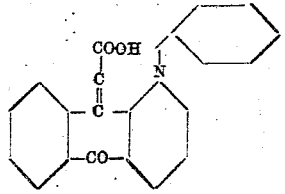

with agents capable of eliminating water.

The dyestuffs thus obtained correspond to the first mentioned general formula and may be denominated "isatanthrenes;" they are difficultly soluble in water and in most of the organic solvents and dye cotton from the vat various tints of great fastness.

The following example illustrates the preparation of the simplest of the isatanthrenes of this series:

Example: 24.3 parts of α-chloanthraquinone are well mixed with 20 parts of carefully dried potassium phenylglycin and 1 part of cuprous chlorid and then heated to boiling with amylalcohol, while stirring, until the intensity of the resulting reddish-blue solution no longer increases, which occurs after some hours. After cooling and removing the amylalcohol, the residue is extracted with a hot solution of sodium carbonate whereupon the new condensation product dissolves to a violet solution. When precipitated by an acid and recrystallized from chloroform, this product forms bluish-red crystals, when crystallized from glacial acetic acid, dark violet needle-like crystals melting at 196–197° C. The analysis shows that this product constitutes an α-anthraquinonylphenylglycin, which probably has the formula:

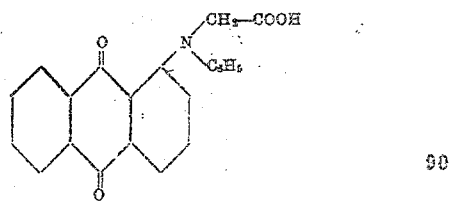

It dissolves in conc. sulfuric acid to a yellow solution, in oleum (20% strength) to a blue solution, in chlorosulfonic acid to a green solution.

36 parts of the aforesaid α-anthraquinonyl-N-phenylglycin, 400 parts of alcohol and 10 parts of concentrated sulfuric acid are boiled for 5 hours in a reflux apparatus and most part of the alcohol is then distilled off. On cooling, the mass solidifies into a dark-red crystalline cake. After filtering, washing with diluted alcohol, pressing and drying a product is obtained which forms a dark red powder soluble in alcohol to a red solution from which it crystallizes as red small needles. 60 parts of the ester thus obtained are heated in an autoclave for two hours to 150° C., while stirring, with 20 parts of caustic alkali and 400 parts of xylene. After cooling, the xylene is expelled by means of steam, the remaining lye is filtered and the brownish, fluorescent solution is acidified by means of a mineral acid. The resulting α-anthra-N-phenylpyrrolcarboxylic acid is precipitated as a powder of a yellow color. After filtering and drying it is freed from the slight impurities it may contain by extraction with benzene. The dyestuff thus obtained dissolves in diluted solution of sodium carbonate to a yellow solution showing a beautiful yellowish-green fluorescence, and dyes wool and silk in a bath acidulated with acetic acid yellow tints. It dissolves in concentrated sulfuric acid to a violet-red solution, in fuming sulfuric acid and chlorosulfonic acid to a claret-red solution with a slight fluorescence. In organic solvents it is difficultly soluble with a green fluorescence. It crystallizes from pyridin as small laminæ of a yellow color.

40 parts of the α-anthra-N-phenyl-pyrrolcarboxylic acid above referred to are introduced at 0° C. into 150 parts of chlorosulfonic acid and this mixture is kept at the aforesaid temperature for 2–3 hours, i. e. until a sample rendered alkaline no longer exhibits any fluorescence. The mass is then put on ice, the product which separates as red flakes is filtered off and extracted by boiling with a strongly diluted solution of alkali. When dry, the new body forms a reddish-brown powder and has the formula:

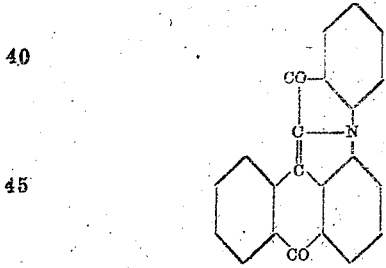

which is difficultly soluble in organic solvents. It dissolves most readily in pyridin with a reddish-brown color. In concentrated sulfuric acid it is soluble to a deep violet-red solution and gives with alkaline hydrosulfite a dark-blue vat which dyes cotton red tints.

Having now described our invention, what we claim is:

1. As a new process, the manufacture of new vat dyestuffs of the isatanthrene series by producing esters of the anthraquinonyl-α-arylglycins obtained from a halogen anthraquinone and an aromatic glycin, transforming them into the anthra-N-arylpyrrolcarboxylic acids by saponification and dehydration, and treating the latter with bodies able to split off water.

2. As new products, the vat dyestuffs of the isatanthrene series having the general formula:

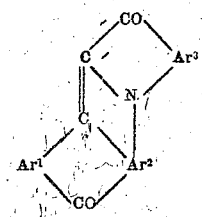

wherein $Ar^1$, $Ar^2$ and $Ar^3$ stand for aryl residues, being scarcely soluble in water and in most of the organic solvents and dyeing cotton from the vat various tints of great fastness.

3. As a new product, the isatanthrene of the formula:

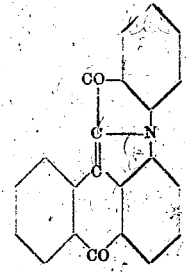

being a reddish-brown powder, difficultly soluble in water and in most of the organic solvents, readily soluble in pyridin with a reddish-brown color, in concentrated sulfuric acid with a deep reddish-violet color, and yielding with alkaline hydrosulfite a dark-blue vat which dyes cotton red tints of great fastness.

In testimony whereof, we affix our signatures in presence of two witnesses.

KARL SCHIRMACHER.
ARTHUR VOSS.

Witnesses:
 JEAN GRUND,
 CARL GRUND.

It is hereby certified that in Letters Patent No. 1,123,390, granted January 5, 1915, upon the application of Karl Schirmacher and Arthur Voss, of Höchst-on-the-Main, Germany, for an improvement in "Vat Dyestuffs and Processes of Making Same," an error appears in the printed specification requiring correction as follows: Page 1, lines 12-20, formula, for

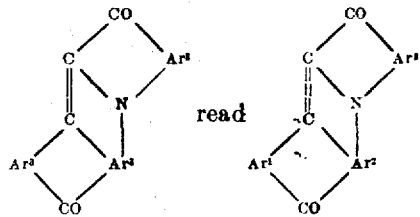

and that the said Letters Patent should be read with this correction therein that the same may conform to the record of the case in the Patent Office.

Signed and sealed this 7th day of September, A. D., 1915.

[SEAL.]             J. T. NEWTON,

*Acting Commissioner of Patents.*